(12) United States Patent
Kim et al.

(10) Patent No.: US 9,284,214 B2
(45) Date of Patent: Mar. 15, 2016

(54) METHOD FOR PRODUCING COATING SOLUTION FOR USE IN SOLAR COLLECTOR MODULES AND COATING COMPOSITION PRODUCED BY THE SAME

(75) Inventors: Yook-Jung Kim, Gwangmyeong-si (KR); Jin-Ho Jang, Daejeon (KR)

(73) Assignee: HYTC CO., LTD., Seoul (KR)

( * ) Notice: Subject to any disclaimer, the term of this patent is extended or adjusted under 35 U.S.C. 154(b) by 657 days.

(21) Appl. No.: 12/852,641

(22) Filed: Aug. 9, 2010

(65) Prior Publication Data

US 2011/0133138 A1     Jun. 9, 2011

(30) Foreign Application Priority Data

Dec. 7, 2009    (KR) ........................ 10-2009-0120735

(51) Int. Cl.
| | |
|---|---|
| C03B 37/016 | (2006.01) |
| C03C 1/00 | (2006.01) |
| C03C 17/02 | (2006.01) |
| C09D 1/00 | (2006.01) |
| C09D 183/04 | (2006.01) |

(52) U.S. Cl.
CPC ................. *C03C 1/008* (2013.01); *C03C 17/02* (2013.01); *C09D 1/00* (2013.01); *C09D 183/04* (2013.01); *C03C 2203/26* (2013.01); *C03C 2203/30* (2013.01); *C03C 2203/32* (2013.01); *C03C 2217/732* (2013.01); *C03C 2218/113* (2013.01)

(58) Field of Classification Search
USPC ............ 427/58, 168, 169, 387; 428/447, 451, 428/429; 106/287.16, 287.23, 287.1, 106/287.34; 65/395
See application file for complete search history.

(56) References Cited

FOREIGN PATENT DOCUMENTS

| | | | | |
|---|---|---|---|---|
| JP | 2000-275819 | * | 3/1999 | |
| KR | 1020030023833 | * | 4/2003 | |
| KR | 10-2004-0035832 | | 4/2004 | ........... C01B 33/146 |
| KR | 10-2004-0089969 | * | 10/2004 | |
| KR | 10-0653585 | | 11/2006 | ............. C03C 17/02 |
| KR | 10-2008-0023888 | | 3/2008 | ............. C03C 17/06 |
| KR | 10-0870213 | | 11/2008 | ............. B01J 21/06 |

* cited by examiner

*Primary Examiner* — Monique Peets
(74) *Attorney, Agent, or Firm* — Harness, Dickey & Pierce, P.L.C.

(57) ABSTRACT

There is provided a method for producing a coating solution used on glass for solar collector modules to enhance optical transmittance, comprising: preparing a sol of particles having a diameter of about ten nanometers to about several hundred nanometers by adding a coagulation-inducing agent to a coating solution to induce coagulation of the coating solution by the sol-gel reaction, wherein the coagulation-inducing agent reacts with aluminum alkoxide.

17 Claims, 4 Drawing Sheets

METHOD FOR PRODUCING COATING SOLUTION FOR USE IN SOLAR COLLECTOR MODULES AND COATING COMPOSITION PRODUCED BY THE SAME

CROSS-REFERENCE TO RELATED APPLICATION

This application claims the benefit and priority to Korean Patent Application No. 10-2009-0120735 filed on Dec. 7, 2009, in the Korean Intellectual Property Office. The entire disclosure of the application identified in this paragraph is incorporated herein by reference.

FIELD

The present disclosure relates to a method of producing a coating solution. Specifically, it relates to a method of producing a coating solution with which glass for solar collector modules is coated.

BACKGROUND

The present disclosure relates to a method of producing a coating solution with which glass used to produce solar collector modules is coated to enhance optical transmittance.

When the incident angle of light is vertical to glass, some of the incident light is lost through reflection at the air/glass interface. In this case, about 4% of the incident light is lost to reflection. For the glass used to cover a photovoltaic system, for example a photoelectric cell or a solar collector, the reflection loss decreases efficiency of the photovoltaic system. Therefore, a variety of methods have been attempted to produce a coating layer on the surface of glass in order to enhance light transmission through the glass.

When at least two layers of a high refractive index material and a low refractive index material are alternately stacked on each other, the wavelength of the reflected light disappears at a certain wavelength range. One example of such layers includes an anti-reflective layer formed on an architectural glass, such as glass from Schott Glaswerke. The anti-reflective layer is produced by the sol-gel method and is subjected to dip coating. The frequency bandwidth of such anti-reflective coatings is physically restricted to one octave, and the anti-reflective coatings are suitable only for visible light, not for the full solar spectrum, which has a wider bandwidth.

Korean Patent Publication No. 10-2008-0023888 describes anti-reflective glass for an automobile. The anti-reflective glass is designed to have low reflection by comprising a coating layer made of at least two materials of different refractive indices that absorb or optically interfere with visible light, thereby reducing the amount of reflected light. More particularly, a multilayer coating process has been attempted by stacking a number of layers through deposition. However, the multilayer coating is limited by the size of glass used for deposition, difficulty in mass-producing the film because film thickness must be controlled with high precision, and its low economical efficiency.

In order to solve these problems, a wet coating method has been proposed. For example, Korean Registered Patent No. 10-0653585 describes an anti-reflective film, a process for forming an anti-reflective film, and anti-reflective glass. The anti-reflective film containing fluorine atoms is produced by preparing a polysiloxane solution including fluoroalkylsilane and coating a film with the polysiloxane solution by using the conventional coating method. The wet coating method is impractical because fluoroalkylsilane is much more expensive than alkoxysilane, making it difficult to meet the price of the solar collector modules on the market.

Korean Registered Patent No. 10-0870213 describes a photocatalytic composition for anti-reflection and a glass substrate coated with the composition. Photocatalysts are proposed for anti-reflection and the production of an anti-reflective coating film using the photocatalysts, but the coating film has anti-reflective performance insufficient to improve solar cell efficiencies due to the intrinsic refractive index of titanium (Ti) used as the photocatalyst in the coating film.

Korean Patent Publication No. 10-2004-0035832 describes a hybrid sol for the production of abrasion-resistant $SiO_2$ anti-reflection layers. Alkoxysilane is produced with a porous structure to produce an anti-reflective film. However, the alkoxysilane restricts storage stability of the coating solution under basic conditions, rendering it difficult to stably produce an anti-reflection coating film.

SUMMARY

The present disclosure is designed to address drawbacks in the field. The present disclosure provides an optical coating composition capable of enhancing the transmittance through the filling array of inorganic nanoparticles, maintaining constant hardness even at its optical thin film thickness, and minimizing production cost by using a single-layer wet coating method.

According to one embodiment, there is provided a method for producing a coating solution which is used on glass for solar collector modules to enhance optical transmittance. The method may comprise preparing a sol of particles having a diameter of about ten nanometers to about several hundred nanometers by adding a coagulation-inducing agent to a coating solution to induce coagulation of the coating solution by the sol-gel reaction, wherein the coagulation-inducing agent reacts with aluminum alkoxide. Without being bound by theory, it is believed the coagulation-inducing agent being used to give rise to the sol gel reaction with aluminum alkoxide proceeds by a radical reaction mechanism.

In this case, the coagulation-inducing agent may comprise at least one substance selected from the group consisting of a silica sol and an alumina sol.

After the sol preparation step, the method according to the present disclosure may further comprise adding a stabilizing agent to the sol prepared in the sol preparation step in order to stabilize the particles.

The method according to the present disclosure may further comprise subjecting the sol prepared in the sol stabilization step to a sol-gel reaction with a metal alkoxide after the sol stabilization step.

When both of the silica sol and alumina sol comprise the coagulation-inducing agent, the method according to the present disclosure may further comprise mixing about 100 parts by weight of the silica sol with about 10 to about 40 parts by weight of the alumina sol.

In general, the coagulation-inducing agent may be used to convert a basic sol into an acidic sol. When the coagulation-inducing agent is basic, the method according to the present disclosure may further comprise adding an acidic catalyst to change the pH into an acidic range. In this case, the sol-gel reaction may be performed at a temperature of about 50° C. to about 80° C.

The silica sol whose particles are about 10 nm to about 200 nm in diameter may be used to perform the sol-gel reaction.

The alumina sol whose particles are about 10 nm to about 200 nm in diameter may be used to perform the sol-gel reaction.

The coagulated particles may have a diameter of about 100 nm to about 500 nm.

In a particular embodiment, there is provided a method for producing a coating solution used on glass for solar collector modules to enhance optical transmittance, the method comprising:

preparing a sol of particles having a diameter of about ten nanometers to about several hundred nanometers by adding a coagulation-inducing agent to a coating solution to induce coagulation of the coating solution by the sol-gel reaction, adding a stabilizing agent to the sol prepared in the sol preparation step, subjecting the sol prepared in the sol stabilization step to a sol-gel reaction with a metal alkoxide after the sol stabilization step, mixing about 100 parts by weight of the silica sol with about 10 to about 40 parts by weight of the alumina sol when both silica sol and alumina sol comprise the coagulation-inducing agent, and adding an acidic catalyst to lower the pH into an acidic range when the coagulation-inducing agent is basic, wherein the coagulation-inducing agent reacts with aluminum alkoxide and comprises at least one selected from the group consisting of a silica sol and an alumina sol, and wherein the sol-gel reaction is performed at a temperature of about 50° C. to about 80° C.

According to another embodiment, there is provided an anti-reflective coating composition comprising a sol prepared as described above, water, an organic solvent, and a catalyst, wherein the metal alkoxide is an alkoxysilane.

BRIEF DESCRIPTION OF THE DRAWINGS

The above and other embodiments, features and other advantages of the present disclosure will be more clearly understood from the following detailed description taken in conjunction with the accompanying drawings.

DETAILED DESCRIPTION

Hereinafter, exemplary embodiments of the present invention will now be described in detail with reference to the accompanying drawings.

Objects of the present disclosure include providing an anti-reflective film having suitable hardness and reliability to be used for solar collectors and producing an anti-reflective film with single layers according to the wet coating method.

As previously stated, the anti-reflective functionality is proposed to realize the porous structure after the metal alkoxysilane is subjected to sol-gel reaction under basic conditions. The problem of coating film hardness is pointed out as a limitation of the porous structure. Enhanced transmittance may be offset by increased density of the coating film when metal alkoxysilane is subjected to sol-gel reaction under the acidic condition to improve the hardness of the coating film.

Another object of the present disclosure is to arrange inorganic particles with a diameter of about ten nanometers to about several hundred nanometers so that the inorganic particles can have a similar array to the porous structure, thereby improving mechanical properties, such as for example hardness, of the filler, while enhancing transmittance of the porous structure.

When light passes through micron-sized pores formed in the porous structure, scattered reflection improves the anti-reflective effect, but the light transmittance deteriorates too suddenly to be suitably applied to solar collectors. When the size of the inorganic particles is decreased from a micrometer scale to a nanometer scale, the light transmittance improves, and the coating film hardness improves proportionately to the kinds of the inorganic particles.

The method according to one exemplary embodiment comprises; preparing a sol of particles having a diameter of about ten nanometers to about several hundred nanometers by inducing coagulation of a coating solution by means of the reaction between radically reactive aluminum alkoxide and an acidic coagulation-inducing agent, wherein when the coagulation-inducing agent produces a sol-gel reaction with radically reactive aluminum alkoxide; the coagulation-inducing agent is used to form a sol whose pH is acidic, whereas an acidic catalyst is added to lower the pH into an acidic range when the pH of the coagulation-inducing agent is basic; and the sol-gel reaction is performed at a temperature of about 25° C. to about 80° C., for example about 30° C. to about 80° C., about 50° C. to about 80° C., or about 50 to about 70° C.

An aqueous silica sol may be used as the coagulation-inducing agent, and it is desirable to use the silica sol having particles of approximately 10 nm to about 200 nm in diameter.

An aqueous alumina sol may be used as the coagulation-inducing agent. The alumina sol may have particles of approximately 10 nm to about 500 nm in diameter, such as about 10 nm to about 200 nm. Also, the aqueous silica sol and the aqueous alumina sol may be used together as the coagulation-inducing agent.

Furthermore, the method according to one exemplary embodiment comprises adding a stabilizing agent to the sol prepared in the sol preparation step in order to stabilize the particles; and subjecting the sol prepared in the sol stabilization step to a sol-gel reaction with metal alkoxide. In some embodiments, the metal alkoxide which may be used herein has the following formula:

Formula (I)

wherein each R is independently branced or unbranched $C_{1-10}$ alkyl group.

EXAMPLES

Some embodiments of the present disclosure will be described in more detail, as follows, without limiting to the embodiments and without deviating from the scope of the disclosure.

Example 1

Methanol (12.8 g), methyl cellosolve (7.9 g) and acetic acid (15 mg) were mixed together in a jacket reactor while the temperature of the jacket reactor was maintained to a temperature of 25° C., and stirred for 10 minutes to prepare a mixture. Then, Brij-56 (0.05 g, poly(oxyethylene) nonionic surfactant) and polyvinylpyrrolidone (30 mmol, MW=40,000) were added to the mixture to prepare a surfactant-containing mixture. Aluminum tri-sec-butoxide (2.8 g) was added to the mixture and mixed at a high speed. Isopropyl alcohol (36 g) was added to prepare an aluminum alkoxide mixture.

Ludox™ HS-40 (40 wt. % colloidal suspension of silica in water containing sodium hydroxide and a mixture of 5-chloro-2-methyl-4-isothiazolin-3-one and 2-methyl-2H-isothiazol-3-one from Grace) was run through a cation exchange resin to convert the HS-40 into an acidic silica sol with a pH of approximately 2 to about 3, and was added dropwise to the previously prepared aluminum alkoxide mixture at a dose of about 3 to about 10% by weight, based on the total amount of the aluminum alkoxide mixture. Then, the polymerization was performed for about 1 to about 10 hours using the sol-gel reaction.

After the completion of the sol-gel reaction, about 0.1 to about 0.5 mol of a curing agent (dibutyl tin laurate, DBTDL) and a leveling agent Byk™-300 (solution of a polyether modified polydimethylsiloxane in 4:1 xylenes/isobutanol) were added to prepare a coating composition.

Example 2

This example was carried out in the same manner as in Example 1, except that A [Al(OC$_3$H$_7$)$_3$] was used instead of the aluminum tri-sec-butoxide used in Example 1.

Example 3

As described in Example 1, an acidic colloidal silica was added to a jacket reactor. The resultant mixture was warmed and reacted for about 1 to about 10 hours while maintaining the temperature of the jacket reactor temperature to a temperature of about 50 to about 70° C., and then cooled to about 30° C. to perform the sol-gel reaction for about 1 to about 3 hours.

Example 4

As described in Example 1, HS-40, AS and TM as the Ludox™ colloidal silicas and a silica sol SS-SOL 100 from S. Chemte (colloidal SiO$_2$ inclusion of 30%, 90-110 nm particle size, stabilized with K$_2$O) were mixed at a weight ratio of 10:20:20:50 respectively. The resultant mixture was run through a cation exchange resin to produce an acidic silica sol at a pH of about 2 to about 3.

A coating composition was prepared in the same manner as in Example 1 using the prepared acidic colloidal silica.

Example 5

As described in Example 4, an acidic colloidal silica was added to a jacket reactor, and the resultant mixture was warmed and reacted for about 1 to about 10 hours while maintaining the temperature of the jacket reactor temperature to a temperature of about 50 to about 70° C., and then cooled to about 30° C. to perform the sol-gel reaction for about 1 to about 3 hours.

Example 6

A coating composition was prepared in the same manner as in Example 1, except that Nanobyk™-3600 (dispersion of alumina nanoparticles (D$_{50}$=40 nm) in water by Byk Chemie) was used as the alumina sol instead of the acidic colloidal silica used in Example 1.

Example 7

As described in Example 6, an alumina sol was added to a jacket reactor, and the resultant mixture was warmed and reacted for about 1 to about 10 hours while maintaining the temperature of the jacket reactor temperature to a temperature of about 50 to about 70° C., and then cooled to about 30° C. to perform the sol-gel reaction for about 1 to about 3 hours.

Example 8

HS-40 and AS as the Ludox™ colloidal silicas and a silica sol SS-SOL 100 from S. Chemte were mixed at a weight ratio of 30:20:50, respectively. The resultant mixture was run through a cation exchange resin to produce an acidic silica sol at a pH of about 2 to about 3.

A coating composition was prepared in the same manner as in Example 1 using the prepared acidic colloidal silica.

Then, an alumina sol Nanobyk™-3600 was added dropwise at a weight percentage of about 10 to about 40% to the acidic silica, based on about 100 parts by weight of the acidic colloidal silica sol to prepare an acidic hybrid nano sol.

A coating composition was prepared in the same manner as in Example 6 using the prepared acidic hybrid nano sol.

Example 9

As described in Example 8, the hybrid nano sol was added to a jacket reactor, and the resultant mixture was warmed and reacted for about 1 to about 10 hours while maintaining the temperature of the jacket reactor temperature to a temperature of about 50 to about 70° C., and then cooled to about 30° C. to perform the sol-gel reaction for about 1 to about 3 hours.

Example 10

As described in Example 1, an acidic silica sol was added and kept for about 30 minutes, and tetramethoxysilane (1.3 g, TMOS, from Aldrich), tetraethoxysilane (0.8 g, TEOS, from Aldrich), distilled water (1.5 g), and itaconic acid (30 mg, Aldrich) were added to perform the sol-gel reaction.

Example 11

As described in Example 3, the acidic colloidal silica was added to a jacket reactor, and the resultant mixture was warmed and reacted for about 1 to about 10 hours while maintaining the temperature of the jacket reactor temperature to a temperature of about 50 to about 70° C., and then cooled to about 30° C. C. TMOS (1.3 g, Aldrich), TEOS (0.8 g, Aldrich), distilled water (1.5 g), and itaconic acid (30 mg, Aldrich) were added to perform the sol-gel reaction for about 1 to about 5 hours.

Example 12

As described in Example 5, the acidic colloidal silica was added to a jacket reactor, and the resultant mixture was warmed and reacted for about 1 to about 10 hours while maintaining the temperature of the jacket reactor temperature to a temperature of about 50 to about 70° C., and then cooled to about 30° C. TMOS (1.3 g, Aldrich), TEOS (0.8 g, Aldrich), distilled water (1.5 g), and itaconic acid (30 mg, Aldrich) were added to perform the sol-gel reaction for about 1 to about 5 hours.

Example 13

As described in Example 7, the alumina sol was added to a jacket reactor, and the resultant mixture was warmed and reacted for about 1 to about 10 hours while maintaining the temperature of the jacket reactor temperature to a temperature of about 50 to about 70° C., and then cooled to about 30° C. TMOS (1.3 g, Aldrich), TEOS (0.8 g, Aldrich), distilled water (1.5 g), and itaconic acid (30 mg, Aldrich) were added to perform the sol-gel reaction for about 1 to about 5 hours.

Example 14

As described in Example 9, the hybrid nano sol was added to a jacket reactor, and the resultant mixture was warmed and reacted for about 1 to about 10 hours while maintaining the temperature of the jacket reactor temperature to a temperature of about 50 to about 70° C., and then cooled to about 30° C. TMOS (1.3 g, Aldrich), TEOS (0.8 g, Aldrich), distilled water (1.5 g), and itaconic acid (30 mg, Aldrich) were added to perform the sol-gel reaction for about 1 to about 5 hours.

Example 15 (Comparative Example)

The sol-gel reaction was performed in the same manner as in Example 11, except that GPTMS [(3-glycidoxypropyl) trimethoxysilane] was used instead of TEOS used in Example 11. The GPTMS gives excellent properties such as hardness and adhesion to the coating films, but the alkoxysilane has three OR residues and one R residue. The R residue hinders formation of a porous structure since its functional group has an epoxy structure, which renders it impossible to enhance transmittance. As listed in Table 1, the coating composition of Example 15 has poor transmittance. That is, it was seen that different results are given according to the kinds of silanes used in the process of forming a porous structure, in comparison to the present disclosure.

Each of the coating compositions prepared in Examples 1 to 14 was coated at a coating film thickness of about 500 nm or less onto silide glass (1 T) to obtain an optical thin film layer.

The visible light transmittance was measured at a wavelength range of about 380 to about 800 nm using JASCO Model V-570 UV-visible specrometer, and the hardness was measured using KS M ISO 15184: 2002.

The transmittance of the silide glass was 90.2%, and the coating compositions prepared in the examples was coated at the coating film thickness, and cured at about 200° C. The results are listed in the following Table 1.

TABLE 1

|  | Transmittance (Single Surface) | Hardness | Adhesion |
| --- | --- | --- | --- |
| Example 1 | 91.1 | H | PASS |
| Example 2 | 90.9 | — | PASS |
| Example 3 | 92.3 | — | PASS |
| Example 4 | 91.6 | H | PASS |
| Example 5 | 92.6 | — | PASS |
| Example 6 | 91.3 | H | PASS |
| Example 7 | 92.4 | — | PASS |
| Example 8 | 91.1 | H | PASS |
| Example 9 | 92.6 | — | PASS |
| Example 10 | 90.8 | H | PASS |

TABLE 1-continued

|  | Transmittance (Single Surface) | Hardness | Adhesion |
| --- | --- | --- | --- |
| Example 11 | 92.1 | H | PASS |
| Example 12 | 92.4 | H | PASS |
| Example 13 | 92.2 | 2H | PASS |
| Example 14 | 92.5 | 2H | PASS |
| Example 15 | 90.4 | 2H | PASS |

When each of the coating compositions prepared in Examples 1 to 14 was used to obtain a coating film with the coating film thickness, the coating films showed their improved optical transmittance from the filling array of the nanoparticles. Also, when the single surface of the silide glass was coated with each of the coating compositions, the coating films have an optical transmittance of 1.0 to 2.5%, whereas the coating films have an optical transmittance of about 2 to about 5% when both surface of the silide glass were coated with each of the coating compositions.

Also, the hardness of the coating films was measured to be a H grade or greater due to the filling effect of the inorganic particulates and the presence of the inorganic silane coating film, which makes it possible to solve the problem concerning the deterioration of the hardness caused by the porous structure.

Figure 1:
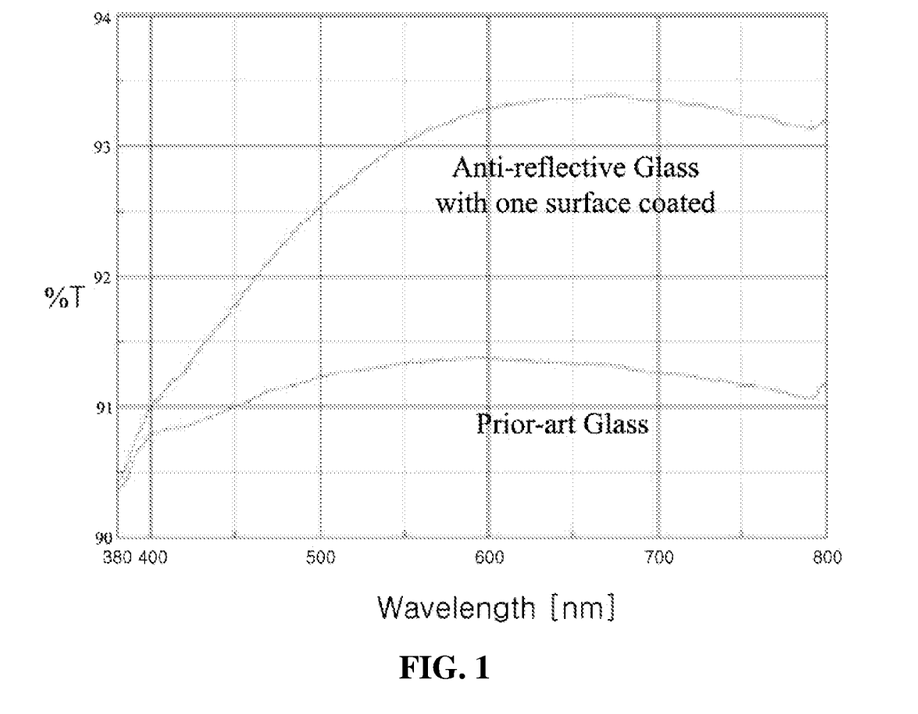
FIGS. 1 and 2 are graphs showing the optical transmittance after application of a coating solution according to one exemplary embodiment.

FIG. 1 is a graph showing the results obtained by comparing the transmittance of the anti-reflective coating glass of Example 14 with that of the glass of Example 15. In this case, the anti-reflective coating glass has one surface coated with the anti-reflective coating composition. Therefore, it was revealed that the difference of the transmittance between the anti-reflective coating glass of Example 14 and the glass of Example 15 was measured to be about 2%.

Figure 2:
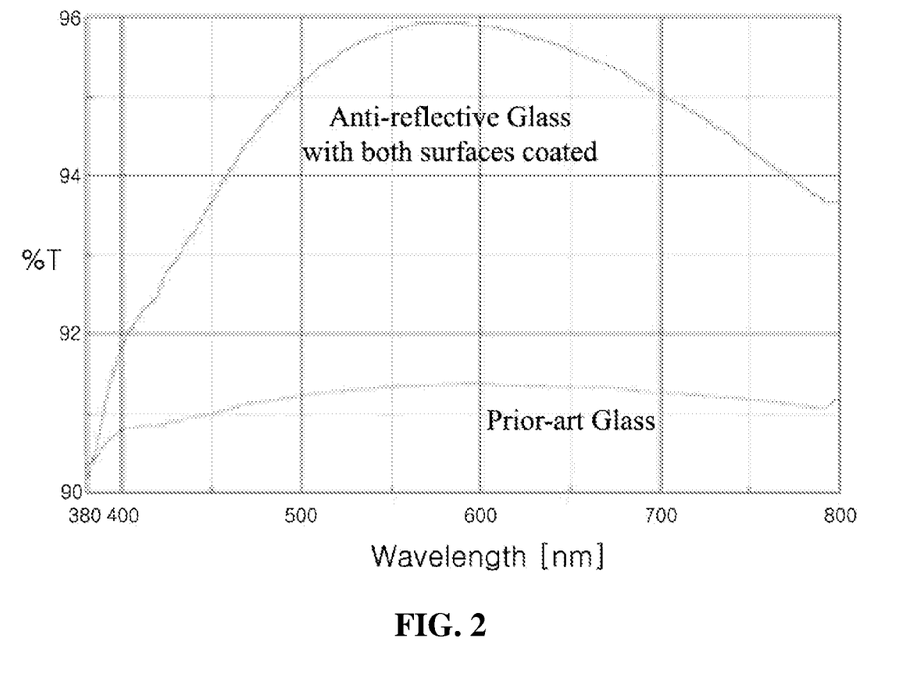

FIG. 2 is a graph showing the results obtained by comparing the transmittance of the anti-reflective coating glass of Example 14 with that of the glass of Example 15. In this case, the anti-reflective coating glass has both surfaces coated with the anti-reflective coating composition. Therefore, the difference of the transmittance between the anti-reflective coating glass of Example 14 and the glass of Example 15 was measured to be about 3% to about 5%, depending on the wavelength applied.

Figure 3:
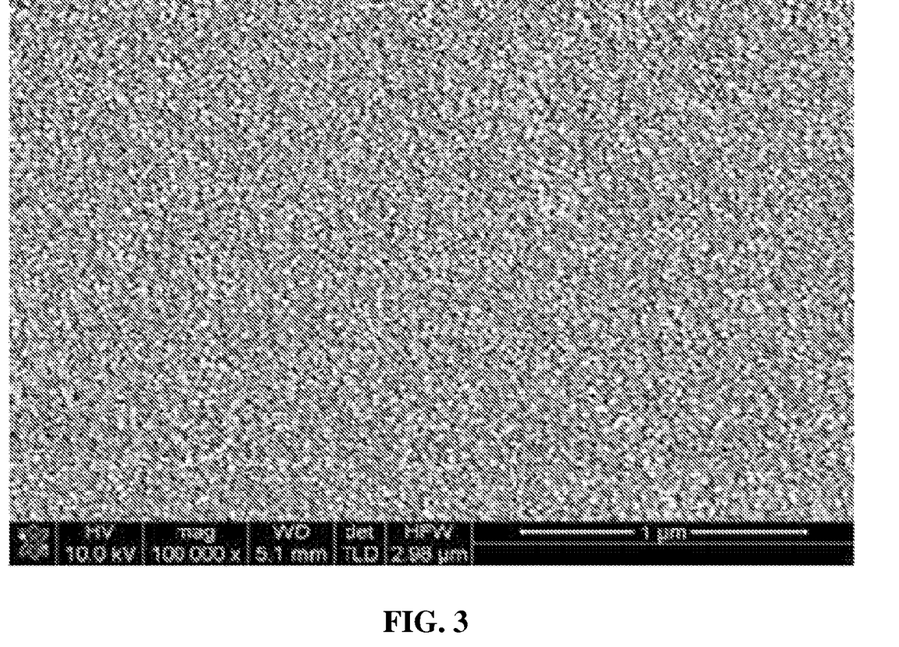
FIG. 3 is a magnified plane photograph showing a coating layer coated with a coating solution according to one exemplary embodiment.
Figure 4:
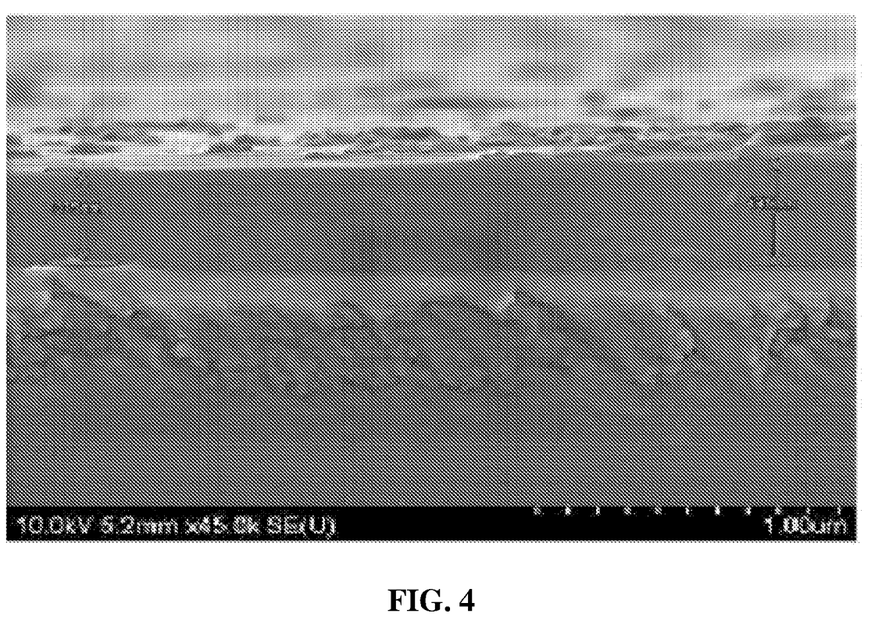
FIG. 4 is a side photograph showing a coating layer coated with a coating solution according to one exemplary embodiment.

FIG. 3 is a photograph taken of the surface of the anti-reflective coating glass prepared in Example 14 using field emission scanning electron microscopy (FE-SEM), and FIG. 4 is a photograph taken of the side surface of the anti-reflective coating glass using FE-SEM. As shown in FIGS. 3 and 4, a single layer rather than multiple layers was formed on the anti-reflective coating glass. FIG. 3 shows that the anti-reflective coating glass has a porous top surface, as measured with the FE-SEM, and FIG. 4 shows that the anti-reflective coating glass has a rough side surface due to the porous structure, as measured with FE-SEM.

When the anti-reflective coating is applied to the outermost glass of the solar collector module, the solar collector module improves transmission, but it is difficult to apply the anti-reflective coating to the solar collector module because of production costs and reliability of conventional multi-layer thin film design. As described above, the present disclosure provides an optical coating composition capable of enhancing transmittance through the filling array of inorganic nanoparticles, maintaining constant hardness even at its optical thin film thickness, and minimizing production cost by using a single-layer wet coating method.

It will be apparent to those skilled in the art that modifications and variations can be made in the present disclosure without deviating from the spirit or scope of the disclosure. Thus, it is intended that the present disclosure cover any such modifications and variations of this disclosure provided they come within the scope of the appended claims and their equivalents. Accordingly, these and other changes and modifications are seen to be within the true spirit and scope of the disclosure as defined by the appended claims.

In the specification, there have been disclosed typical embodiments of the disclosure and, although specific terms are employed, they are used in a generic and descriptive sense only and not for purposes of limitation. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The terminology used herein is for the purpose of describing particular example embodiments only and is not intended to be limiting. As used herein, the singular "a", "an" and "the" may be intended to include the plural forms as well, unless the context clearly indicates otherwise. The terms "comprises", "comprising", "including", and "having" are inclusive and, therefore, specify the presence of stated features, integers, steps, operations, elements, and/or components, but do not preclude the presence or addition of one or more other feathers, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A method for producing a coating solution for glass of a solar collector module, comprising:
   adding a coagulation-inducing agent containing a silica sol and/or an alumina sol to a solution containing aluminum alkoxide to induce a sol-gel reaction to produce a sol comprising particles of about ten nanometers to about five hundred nanometers (nm) in diameter,
   adding a stabilizing agent to the sol to stabilize the particles in the solution; and
   subjecting the sol to a sol-gel reaction with a metal alkoxide.

2. The method according to claim 1, wherein the metal alkoxide is aluminum alkoxide.

3. The method according to claim 2, further comprising:
   mixing about 100 parts by weight of the silica sol with about 10 to about 40 parts by weight of the alumina sol when both silica sol and alumina sol comprise the coagulation-inducing agent.

4. The method according to claim 3, further comprising:
   adding an acidic catalyst to lower the pH into an acidic range when the coagulation-inducing agent is basic, wherein the sol-gel reaction is performed at a temperature of about 50° C. to about 80° C.

5. The method according to claim 4, wherein the silica sol comprises particles of about 10 nm to about 200 nm in diameter.

6. The method according to claim 4, wherein the alumina sol comprises particles of about 10 nm to about 200 nm in diameter.

7. The method according to claim 1, wherein the coagulated particles have a diameter of about 100 nm to about 500 nm.

8. A method for producing a coating solution for glass of a solar collector module to enhance optical transmittance, comprising:
   adding a coagulation-inducing agent containing a silica sol and/or an alumina sol to a solution containing aluminum alkoxide to induce a sol-gel reaction, thereby preparing a sol comprising particles of about ten nanometers to about five hundred nanometers (nm) in diameter,
   adding a stabilizing agent to the sol to stabilize the particles in the solution,
   subjecting the sol to a sol-gel reaction with an aluminum alkoxide after adding the stabilizing agent,
   mixing about 100 parts by weight of the silica sol with about 10 to about 40 parts by weight of the alumina sol when both silica sol and alumina sol comprise the coagulation-inducing agent, and
   adding an acidic catalyst to lower the pH into an acidic range when the coagulation-inducing agent is basic,
   wherein the coagulation-inducing agent reacts with aluminum alkoxide and comprises at least one selected from the group consisting of a silica sol and an alumina sol, and
   wherein the sol-gel reaction is performed at a temperature of about 50° C. to about 80° C.

9. The method according to claim 8, wherein the sol comprises particles of about 10 nm to about 200 nm in diameter.

10. An anti-reflective coating composition comprising the sol prepared by the method of claim 2, water, an organic solvent, and a catalyst, wherein the metal alkoxide is an alkoxysilane.

11. The anti-reflective coating composition of claim 10, wherein the method further comprises mixing about 100 parts by weight of the silica sol with about 10 to about 40 parts by weight of the alumina sol when both silica sol and alumina sol comprise the coagulation-inducing agent.

12. The anti-reflective coating composition of claim 11, wherein the method further comprises adding an acidic catalyst to lower the pH into an acidic range when the coagulation-inducing agent is basic, wherein the sol-gel reaction is performed at a temperature of about 50° C. to about 80° C.

13. The anti-reflective coating composition of claim 12, wherein the silica sol comprises particles of about 10 nm to about 200 nm in diameter.

14. The anti-reflective coating composition of claim 13, wherein the alumina sol comprises particles of about 10 nm to about 200 nm in diameter.

15. An anti-reflective coating composition comprising the sol prepared by the method of claim 8, water, an organic solvent, and a catalyst, wherein the metal alkoxide is an alkoxysilane.

16. The method according to claim 1, wherein the stabilizing agent is selected from dibutyl tin laurate and a solution of a poly ether modified polydimethylsiloxane in 4:1 xylenes/isobutanol.

17. The method according to claim 1, wherein the metal alkoxide has the following formula:

Formula (I)

wherein each R is independently branched or unbranched $C_{1-10}$ alkyl group.

* * * * *